United States Patent
Gelbart

[11] Patent Number: 6,147,789
[45] Date of Patent: Nov. 14, 2000

[54] HIGH SPEED DEFORMABLE MIRROR LIGHT VALVE

[76] Inventor: Daniel Gelbart, 4688 Pine Cres., Vancouver, Canada, V6J-4L2

[21] Appl. No.: 09/072,753

[22] Filed: May 4, 1998

[51] Int. Cl.[7] .............................. G02B 26/02; B41J 2/47
[52] U.S. Cl. .......................... 359/231; 359/230; 359/291; 359/295; 359/900; 347/135; 347/255
[58] Field of Search ..................................... 359/233, 224, 359/291, 295, 846, 847, 850, 852, 855, 292, 230, 231, 237, 238, 290, 319, 900; 348/755, 771; 345/31, 85, 108; 347/135, 136, 239, 255

[56] References Cited

U.S. PATENT DOCUMENTS

| | | | |
|---|---|---|---|
| 2,644,208 | 7/1953 | Auphan | 164/34 |
| 2,682,010 | 6/1954 | Orthuber | 315/3 |
| 3,746,911 | 7/1973 | Nathanson et al. | 315/21 |
| 3,886,310 | 5/1975 | Guldberg et al. | 348/771 |
| 3,912,370 | 10/1975 | Roach | 359/294 |
| 4,013,345 | 3/1977 | Roach | 359/294 |
| 4,441,791 | 4/1984 | Hornbeck | 359/295 |
| 4,680,579 | 7/1987 | Ott | 348/755 |
| 4,872,743 | 10/1989 | Baba et al. | 359/319 |
| 5,307,082 | 4/1994 | Silverberg | 359/847 |
| 5,311,360 | 5/1994 | Bloom et al. | 359/572 |
| 5,369,433 | 11/1994 | Baldwin et al. | 348/207 |
| 5,457,566 | 10/1995 | Sampsell et al. | 359/292 |
| 5,508,840 | 4/1996 | Vogel et al. | 359/291 |
| 5,517,359 | 5/1996 | Gelbart | 359/623 |
| 5,661,592 | 8/1997 | Bornstein et al. | 359/291 |
| 5,719,846 | 2/1998 | Matoba et al. | 369/112 |
| 5,822,110 | 10/1998 | Dabbaj | 359/291 |

FOREIGN PATENT DOCUMENTS

| | | | |
|---|---|---|---|
| 599154 A1 | 6/1994 | European Pat. Off. | 359/846 |
| 0130722 | 7/1985 | Japan | 359/319 |
| 46475 | 10/1916 | Sweden | 359/224 |

*Primary Examiner*—Cassandra Spyrou
*Assistant Examiner*—John Juba, Jr.
*Attorney, Agent, or Firm*—Steven G. Lisa, Esq.

[57] ABSTRACT

A deformable mirror light valve comprised of an array of silicon nitride ribbons, metalized to reflect light. Each ribbon is electrostatically deformed to form a cylindrical mirror. Each deformable ribbon modulates the light of one pixel by focusing the reflected light through a slit. An alternative embodiment focuses the light onto a stop. The ribbon structure has a fast response time combined with high contrast.

9 Claims, 2 Drawing Sheets

HIGH SPEED DEFORMABLE MIRROR LIGHT VALVE

FIELD OF INVENTION

The invention relates to modulating light beams and particularly to modulating light using light valves based on deformable mirrors.

BACKGROUND OF THE INVENTION

A light valve or multiple light valves are used when a large number of light spots have to be individually modulated.

Prior art deformable mirror light valves can be generally divided into three types:

a. Cantilever or hinged mirror type deflecting the light when bending or tilting. The best known example in this category is the DMD technology developed by Texas Instruments.

b. Membrane light valves where a flat membrane is deformed into a spherical mirror, focusing the light.

c. Grating light valves diffracting the light by forming a periodic pattern. The best known example in this category is the Grating Light Valve being developed by Silicon Light Machines (Sunnyvale, Cal.). Introduction to grating light valves was available at the time of filing this application at the web site of Silicon Light Machines, www.siliconlight.com. That site contained an article entitled "The Grating Light Valve: Revolutionizing Display Technology" by D. M. Bloom of Silicon Light Machines. This type is also referred to as "cyclic recording systems" in earlier literature.

The major disadvantage of the first type, that is, the hinged or cantilevered mirror type, is slow response time. Typically response time in these devices is on the order of 10 microseconds. This is due to the low natural frequency of a cantilever mirror and the large deflection required.

The major disadvantage of the second type, the membrane light valve is difficulty in fabrication, as the membrane is supported around its complete periphery making it difficult to fabricate the cavity under it by micromachining. Micromachining is the most desirable fabrication method for deformable mirror light valves as it uses standard processes which have been developed for the manufacturing of integrated circuits. The difficulty in fabricating a monolithic membrane device of this type requires a multi-step process where micromachining and bonding of a membrane is required. An example of such a membrane device is shown in U.S. Pat. No. 4,441,791. The device cannot be fabricated as a monolithic device (i.e. out of a single piece of silicon) because of the membrane.

The major disadvantage of the third type, that being the grating light valve, is low optical efficiency. In a grating light valve there are two ways to use the device: the zero order beam or the first order. For zero order use, the contrast ratio is poor. For first order use the optical efficiency is low, as each first order beam contains less than 50% of the energy. This can be improved by a method known as "blazing" in which the ribbons in a grating light valve are tilted or by deflecting the multiple ribbons forming a spot using a progressively increasing deflection (i.e. the ribbons forming one spot from a "staircase" shape when deflected). While this can overcome some of the light loss it still requires multiple ribbons for each light spot.

Another object it is the object of this invention to have a device with the fast response time of a grating light valve but with the simplicity and ease of fabrication of simpler devices, having only one moving element per spot. Another object of the invention is to create a light valve with high contrast, high efficiency and ability to handle high incident power. While the main use of the invention is as a linear light valve, a two dimensional array can also be built using the invention.

SUMMARY OF THE INVENTION

The invention uses an array of silicon nitride ribbons, micromachined on top of a silicon substrate using conventional integrated circuit fabrication technology. The ribbons can be deflected under an electrostatic force to form a cylindrical reflector. A thin metal coating, typically aluminum, is deposited on the surface or top of the ribbons for increased reflectivity. Since the required deflection of the ribbon in order to form an effective cylindrical mirror is quite small, the response time is fast and the voltage required to deform the ribbon is low. The high elastic modules of silicon nitride, combined with a very low coefficient of thermal expansion, allows the device to withstand very high incident powers, as encountered in thermal imaging and laser projection displays. The light valve can be used in "brightfield" or "darkfield" (Schlieren) mode. In summary, the invention uses the fabrication methods developed for grating light valves to build a deformable mirror light valve combining the fabrication and speed advantages of the former with the simplicity of the latter.

DESCRIPTION OF THE DRAWINGS

FIG. 1-b shows a cross section of the invention in the energized state.

DESCRIPTION OF THE PREFERRED EMBODIMENT

Figure 1A:
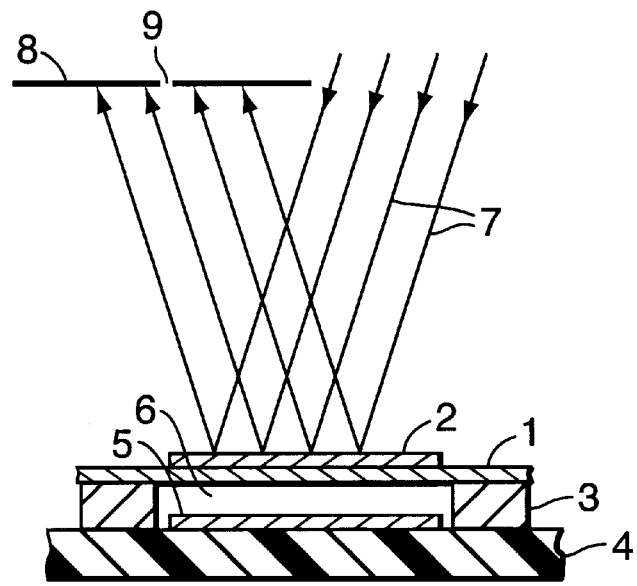
FIG. 1-a shows a pictorial cross section of the invention in the non-energized state.
Figure 1B:
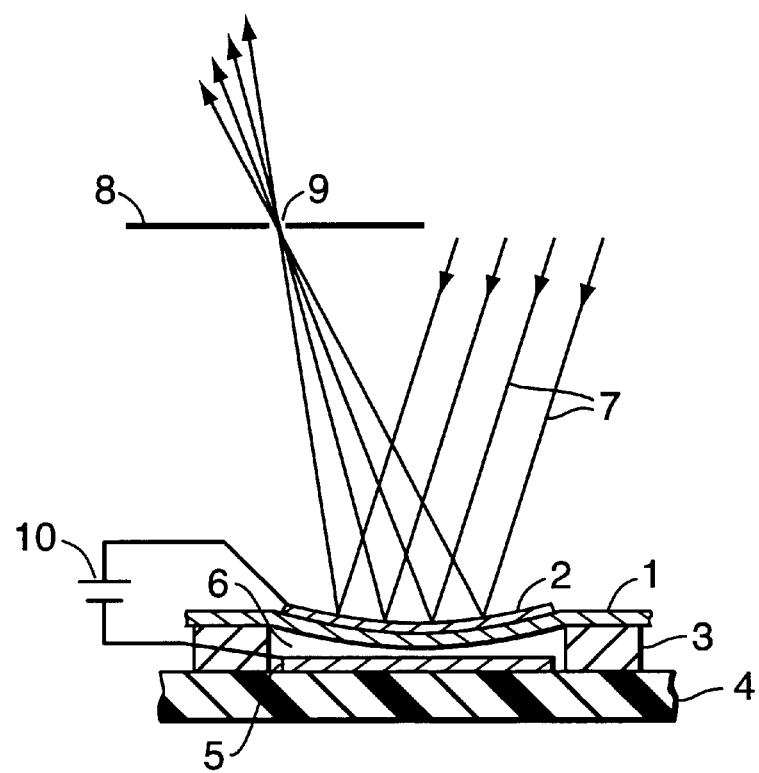

Referring now to FIG. 1, an array of ribbons such as the single ribbon 1 is suspended above a silicon substrate 4, separated by a layer frame 3. Layer 3 can be metallic or non-metallic. The area 6, which is a void zone under each ribbon is made hollow, with the frame or layer 3 surrounding the hollow, using a sacrificial layer micromachining process.

A metal coating 2 which can be a highly reflective surface such as a metalized surface such as aluminum surface, on top of ribbon 1 serves both as an electrode and as a reflective layer. A second electrode 5 is deposited at the bottom of airspace 6. Electrodes 2 and 5 form a capacitor.

New by applying a voltage 10 between both electrodes, ribbon 1 is deformed due to the electrostatic attraction. The shape of the deformed ribbon can be approximated by a cylindrical surface. A hyperbolic cosine function would be a more accurate representation, but for deflection much smaller than the length of the ribbon the difference between the equations is not significant.

New light beam 7 is reflected by thecoating 2. When the device is not energized most of the reflected light is blocked by stop 8. The stop 8 is a barrier that is not light transmissive. It may be considered as representing a non-transparent area. The narrow slit 9 being transparent area, in stop 8 allows only a small amount of light to go through when there is not energization of the capacitor made up of electrodes 2 and 5. These two elements, the non-transparent area 8 and the transparent area 9 comprise a combination of transparent and non-transparent areas for the change of focus of the incident light from light beam 7 into a change of intensity of the light. When the device is energized as shown in FIG. 1-*b*, the cylindrical shape of the ribbon resulting from the relative downward deflection of the mirror surface electrode 2 causes the reflected beam to come to a focus at the slit 9 formed in the barrier and most of the light can pass. It is obvious that if the position of the slit 9 and stop 8 are reversed the device can be used as well. In this case most of the light will pass beyond the stop in the non-energized state. These two modes of operation are sometimes referred to as "darkfield" and "brightfield" respectively.

The main advantage of this method of using a deflected mirror responsive to an electric charge is that very small deflections, typically below one micron, are sufficient for effective operation. Making slit 9 wider gives more light transmission in this "on" state but lowers contrast in the "off" state due to increased light leakage. A good value is to make slit 9 comparable to the diffraction limit of the cylindrical mirror. The relationship between the ribbon or mirror sag, focal length and contrast is easy to derive. For a ribbon length of "l" and a sag (when energized) of "h" the radius of curvature is approximately $l^2/8h$, and the equivalent focal length is $l^2/16h$. For a slit width which is about the diffraction limit of the mirror (about equal to the $f/\#$ of the optics, expressed in microns, for visible and near IR light), the contrast is equal to the ratio between the beam width (which is the same as the ribbon length) and the slit width. Thus, $f/\#=1:l^2/16h=16h/l$, which also equals the slit width in microns. The contrast is $16h/l:l=16h$, where "h" is the sag in microns. This result is independent of the ribbon length l. The ribbon length, however, does affect the response time and drive voltage required. For a 10:1 contrast range (sufficient for thermal imaging applications) h=0.6 micron, independent of ribbon length. At this contrast ratio optical efficiency is over 75%. Higher contrast can be achieved if lower efficiency can be tolerated.

The exact details of fabrication are disclosed in U.S. Pat. Nos. 5,311,360 and 5,661,592. They are identical to the steps used in fabricating grating light valves and need not be detailed here. With a ribbon length of l=500 micron and h=0.6 micron a device switching in less than one microsecond with a voltage of under 50V can be fabricated. This allows not only the light valve but also the electronic drivers to be fabricated on the same substrate. The advantages of using silicon nitride instead of silicon or aluminum for the ribbon material are faster response time (due to higher resonant frequency) higher power handling capability (due to lower coefficient of thermal expansion and very high temperature resistance) and longer life, as silicon nitride is less susceptible to fatigue than aluminum.

The invention is particularly useful in two areas: laser imaging, particularly with near IR high power lasers, and projection displays. By the way of example, a system using the invention for laser imaging is detailed in FIG. 2. A linear array of ribbons 1 are monolithically fabricated on a silicon substrate 4. Each energized ribbon takes the form of a cylindrical mirror. A laser 11 is generating a line illumination 7 using an anamorphic beam expander made of cylindrical lenses 12 and 13. It is clear that many other methods can be used to generate the line illumination. A particularly useful method for illumination is disclosed in U.S. Pat. No. 5,517,359. Slit 9 in stop 8 allows the light from the energized ribbons to pass while blocking most of the light from the non-energized ribbons. Lens 14 forms an image of ribbons 1 on the light sensitive material 15, mounted on drum 16. Only the energized ribbons create a mark 17 as the light reflected from non-energized ribbons is blocked by stop 8. All other details of such imaging systems, such as creating a two dimensional scan and data synchronization are well known in the art of image recording.

Figure 2:
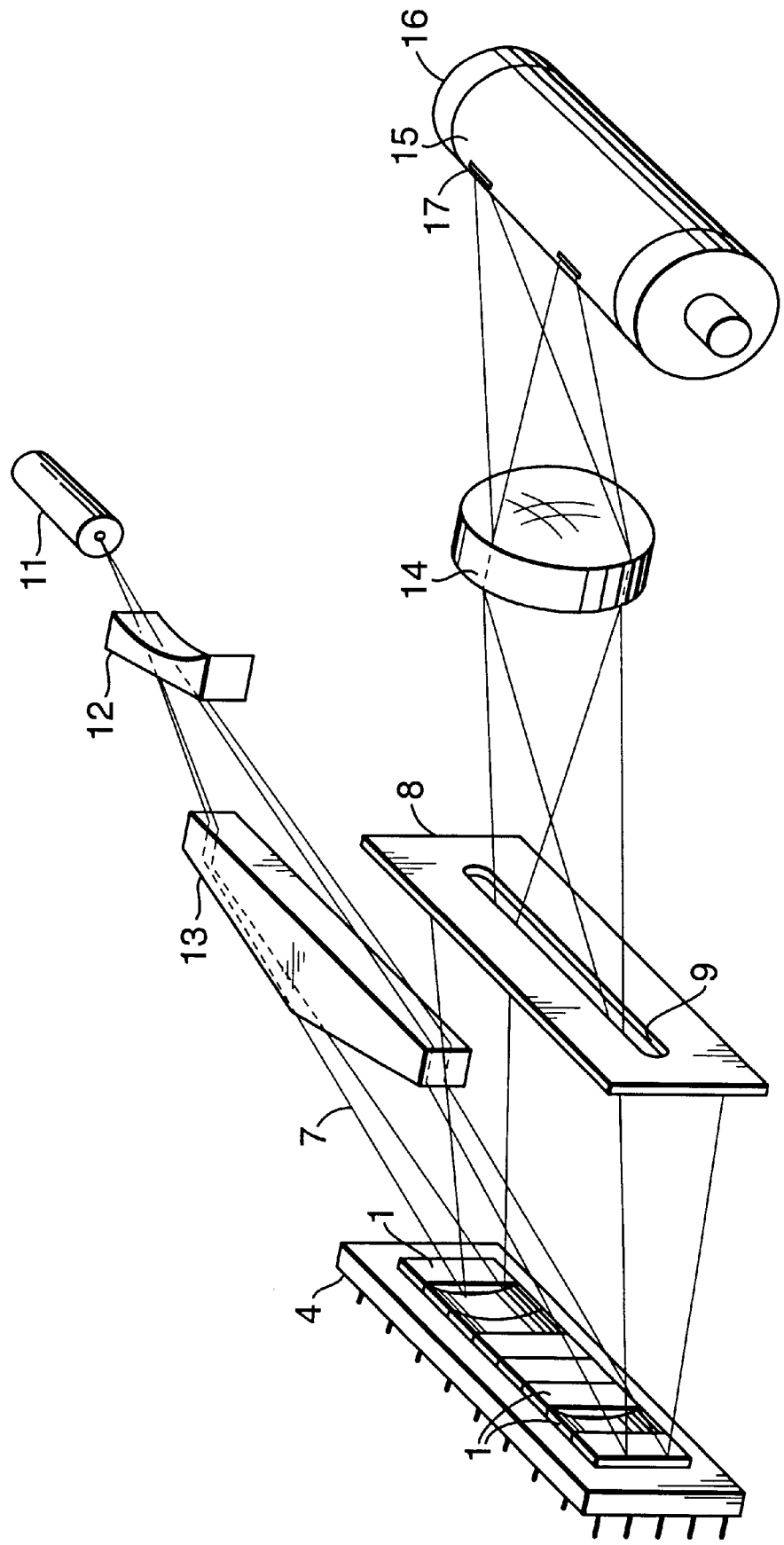
FIG. 2 shows the use of the invention in a laser imaging system.

In one form of the invention, a high-speed deformable mirror light valve. This light valve has a mirror component that is deformable from a flat surface to a cylindrical shape surface. The light valve includes one or more than one addressable mirrors each in the form of a ribbon supported at both ends. The ribbon is formed of a substrate of silicon nitride acting as a substrate supporting a conductive surface. As part of the light valve a light sensitive material is positioned proximate, meaning "in the vicinity of," as shown in FIG. 2, to at least one of the mirrors. In this invention there is a stop having an aperture therein located between at least one of the mirrors, more than likely, all of the mirrors, and the light sensitive material, which in this case may be item 15 in FIG. 2. The aperture formed in the stop, for instance the slit 9 in FIG. 2, is located at the focal point of light reflected from one or more than one of the mirrors which has been deformed into a cylindrical shape surface. Such deformation is accomplished by means of an electrostatic charge as described above.

The light refracted from the deformed mirror surface is now focused light that is separated from non-focused light by the aperture 9 in the stop 8.

Although the invention is described as a specific embodiment, it is understood that alterations and modifications of this invention will become apparent to those skilled in the art. It is therefore intended that the following claims be interpreted as covering all such alterations and modifications as fall within the true spirit and scope of the invention.

What is claimed is:

1. A light valve comprising:

a plurality of individually addressable and micromachined ribbons of silicon nitride each forming an energizable capacitor which may be selectively deformed into an approximately cylindrical form;

a mirror surface formed on each silicon nitride ribbon, said mirror surface having a focus which changes in accordance with the deformation of said eneraizable capacitor;

a target surface remote from the mirror surfaces; and an aperture, positioned between the mirror surfaces and the target surface, for converting the change in focus of each mirror surface into a light intensity change; and a source of electrical energy coupled to and configured to selectively energize and deform each capacitor.

2. The apparatus of claim 1 further including a lens located between said aperture and said target surface.

3. The apparatus of claim 1 wherein said target surface is a light sensitive surface.

4. A method of forming a high speed deformable mirror light valve comprising the acts of:

(1) forming a ribbon including an electrically conductive surface on a silicon nitride surface, the ribbon having first and second ends;

(2) supporting the ribbon at its first and second ends;

(3) deforming the ribbon into a mirror having an approximately cylindrical shape by applying an electrical signal to the conductive surface;

(4) providing a source of light reflected by said mirror;

(5) placing an element including transparent and nontransparent areas in a manner that converts said deformation of said mirror into changes of intensity of said reflected light at approximately the focal point of the mirror.

5. The method as setforth in claim 4 further including the act of depositing a reflective coating on said conductive surface.

6. The method as set forth in claim 4 wherein the act of forming the ribbon includes the act of micro-machining the ribbon.

7. The method of deforming the ribbon as in claim 6 includes deforming the ribbon into the micro-machined silicon nitride surface.

8. The method of claim 4 wherein the act of placing said transparent and nontransparent areas at approximately the focal point of the mirror includes the act of forming an aperture of said transparent and nontransparent areas and placing said aperture at approximately the focal point of the mirror.

9. The invention in accordance with claim 8 wherein said aperture is a linear aperture.

* * * * *